Sept. 6, 1966  F. J. LINGEL  3,271,643
LIMIT STOP CONTROL FOR SYNCHRO SYSTEM
Filed Dec. 23, 1963  2 Sheets-Sheet 2

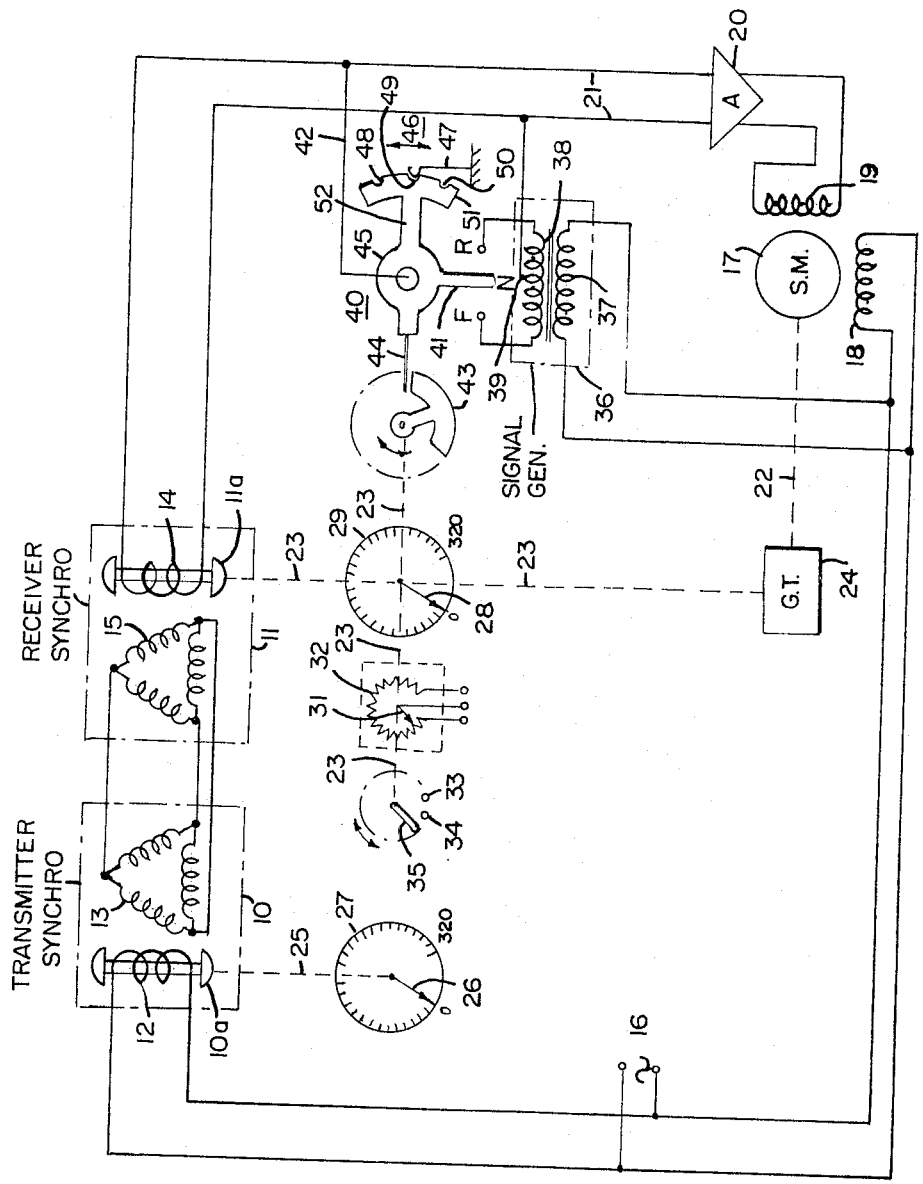

FIG. 2

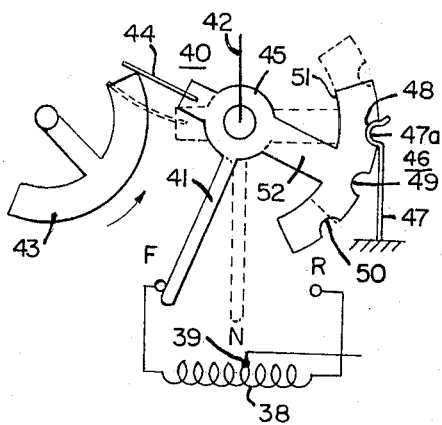

FIG. 3

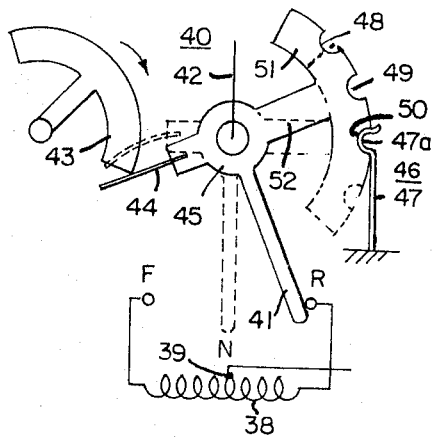

FIG. 4

| TRANSMITTER | RECEIVER | SWITCH POS. | EFFECTIVE AMPLIFIER SIGNAL | CONDITION |
|---|---|---|---|---|
| | | N | SYNCHRO | A |
| | | R | OVERRIDE REVERSE POLARITY | B |
| | | N | SYNCHRO | C |
| | | N | SYNCHRO | D |

| TRANSMITTER | RECEIVER | SWITCH POS. | EFFECTIVE AMPLIFIER SIGNAL | CONDITION |
|---|---|---|---|---|
| | | N | SYNCHRO | E |
| | | F | OVERRIDE FORWARD POLARITY | F |
| | | N | SYNCHRO | G |
| | | N | SYNCHRO | H |

FIG. 5

INVENTOR.
FREDERICK J. LINGEL
BY Richard E. Hosley
ATTORNEY

3,271,643
LIMIT STOP CONTROL FOR SYNCHRO SYSTEM
Frederick J. Lingel, Lynnfield, Mass., assignor to General Electric Company, a corporation of New York
Filed Dec. 23, 1963, Ser. No. 332,749
8 Claims. (Cl. 318—30)

The present invention relates to electric servo systems of the type wherein an input quantity fed to a transmitter synchro is reproduced at a receiver synchro with force or torque amplification provided by a servomotor. In addition to use as a torque or force amplifier, such systems are frequently used for remote indication or control or both, the information pertaining to the input quantity to be reproduced being transmitted electrically by connections between the transmitter and receiver synchros.

In many applications of electric servo systems of the type referred to above, the receiver synchro has a rotor the rotary movement of which is limited by mechanical stops to a range less than 360° in order to prevent damage to the remote indicator or remote-controlled equipment that would result from rotation of the receiver synchro beyond 360°. The use of such stops, however, gives rise to another problem when, because of power failure or some other reason, the transmitter and receiver synchro become displaced more than 180 electrical degrees. In such a case the polarity of the signal from the receiver synchro becomes reversed so that the servomotor drives the rotor of the receiver synchro against one of the stops and locks it in that position. In order to overcome this rotor-locking problem, it has been proposed heretofore to provide a set of limit-switch-controlled relays that act to disconnect the receiver synchro and apply a reverse signal to the servomotor to back it away from the stop and thereafter reconnect the receiver synchro to the servomotor for normal synchronizing action. Such a system, while operative, has the disadvantage that the relays and control switches are complicated, bulky and heavy. This gives rise to reliability problems as well as space and weight problems where the servo system must be mounted in a small space. This is frequently the case where such equipment is used on aircraft and other vehicles where reliability is essential, space is at a premium and weight must be kept to a minimum.

Accordingly, it is the object of this invention to provide a servo system with a reset adjustment for reversing the servomotor adjacent the stop positions that is simple, reliable and requires no relays, whereby the cost, size and weight of the equipment are reduced substantially.

Further objects and advantages of the invention will become apparent as the following description proceeds.

Briefly, in accordance with the invention, a servo system is provided in which a servomotor normally drives a receiver synchro in a conventional manner between forward and reverse stops displaced less than 360°. In systems of this type when the receiver synchro and the transmitter synchro become displaced by more than 180 electrical degrees because of a power failure or for some other reason, the servomotor tends to drive the receiver synchro in a reverse direction against one of the stops and lock it in that position. According to the invention, this is prevented by use of an override signal generator and a switching arrangement comprising a reset switch positioned by an actuator coupled to the receiver synchro rotor. When the receiver synchro rotor approaches a stop position, the reset switch is actuated and connects the override signal generator into a control circuit so as to cause the servomotor to reverse and drive the rotor away from the stop to a position where normal servo action can occur, whereupon this override signal generator is disconnected to permit normal servo action. By proper selection of the impedance of the override signal generator relative to the impedance of the control winding of the receiver synchro and by connecting it in the input circuit of the servo amplifier controlling the servomotor as described more fully below, the servomotor switching is accomplished in a simple and reliable manner without the use of relays, thereby substantially reducing the size, weight and cost of the servo system.

For a better understanding of the invention, reference should be made to the following detailed description taken in connection with the accompanying drawings in which:

FIGURE 1 is a combined circuit and schematic structure diagram showing a servomotor system with automatic reset embodying the present invention;

FIGURES 2 and 3 show the reset switch forming a component of the system of FIGURE 1 in different operative positions; and FIGURES 4 and 5 are diagrams in tabular form illustrating different operating conditions of the servo system useful in explaining the operation of the invention.

Referring to FIGURE 1 of the drawing, there is disclosed an electric servo system embodying the invention. As shown, the system comprises a transmitter synchro 10 and a receiver synchro 11. The transmitter synchro has a rotor 10a carrying a rotor winding 12 and a stator having a polyphase stator winding 13. Similarly, the receiver synchro has a rotor 11a with a rotor control winding 14 and a stator with a polyphase stator winding 15, the stator windings of the transmitter and receiver synchros being electrically connected back-to-back as shown. With the rotor winding 12 of the transmitter synchro connected to a suitable source of alternating current 16, the rotor control winding 14 of the receiver synchro has an output voltage, the polarity of which varies with the direction of departure of the receiver synchro rotor from a position of angular correspondence with the transmitter synchro rotor as is well understood by those skilled in the synchro art. In order to continuously drive the rotor of the receiver synchro into correspondence with the rotor of the transmitter synchro with force or torque amplification, there is provided a servomotor 17 which may be of the conventional two-phase induction type having two field windings 18 and 19. The winding 18 is connected to the alternating current source 16, as shown, and the winding 19 is reversibly energized from the output of a polarity-sensitive electroresponsive means shown as an amplifier 20. The amplifier 20 has an input circuit 21 connected to the rotor winding 14 of the receiver synchro. The servomotor 17 is coupled by shafts indicated by dotted lines 22 and 23 through a gear reduction train 24 so that the servomotor continuously drives the receiver synchro rotor at a relatively low speed into a position of correspondence with the rotor of the transmitter synchro.

The input to the transmitter synchro may, as shown, be the rotary position of a shaft 25 actuated in accordance with any suitable input quantity to be reproduced with torque amplification by the receiver synchro 11. In the drawing the position of the input shaft 25 is indicated by a pointer 26 moving relative to a fixed circular scale 27 which may, as shown, be graduated in degrees running from 0 to something less than 360—for example, 320°. A second pointer 28 functioning as an indicator is mechanically coupled to the shaft 23 to rotate therewith and move with reference to a fixed circular scale 29 graduated in degrees similar to the transmitter pointer scale 27.

The servo system may also be used to drive a suitable load for purposes of remote control as well as indication. As an example, the receiver synchro rotor is shown as being coupled by means of an extension of shaft 23 to drive a wiper 31 of a potentiometer 32 used to control equipment, not shown. In such a system it is necessary to provide stops to prevent the potentiometer and indicator from being driven beyond its operating limits and thereby damaged. In the diagram such stops are illustrated schematically as forward and reverse stops 33 and 34 which are engaged by an arm 35 coupled to the shaft 23 several degrees beyond the limits of rotary movement of the receiver synchro rotor and indicator 28 to establish forward and reverse limits of travel.

The servo system as thus far described is conventional and will be well understood by those skilled in the art. Thus, when the rotor of the transmitter synchro is displaced by rotation of input shaft 25, a voltage appears across the rotor winding 14 of the receiver synchro, the polarity of which is indicative of the direction of displacement of the receiver synchro rotor from a position in correspondence with the rotor of the transmitter synchro. This voltage, which is amplified by the polarity-sensitive amplifier 20, is applied to the field winding 19 of the servomotor 17, causing it to rotate in a direction to restore angular correspondence between the rotor of the receiver synchro and that of the transmitter synchro. Similarly, when the rotor of the transmitter synchro is displaced in the opposite direction, a reverse voltage appears across the rotor winding 14 causing the servomotor 17 to operate in the opposite direction to restore correspondence between the transmitter and receiver synchros. Thus, the system operates continuously to synchronize the rotary position of the receiver synchro with that of the transmitter synchro with force or torque amplification provided by the servomotor.

With systems of the type described above, a difficulty is encountered when the rotors of the transmitter and receiver synchros becomes displaced by an amount greater than 180 electrical degrees. In the simple case illustrated wherein the transmitter and receiver synchros have simple, two-pole windings, the number of electrical degrees corresponds to the number of mechanical degrees of displacement of the synchro rotors as will be understood by those skilled in the art. In such a case the polarity of the output voltage across the receiver synchro winding 14 is in such a direction as to cause the servomotor to drive the rotor against one of the stops and to lock it in that position. In accordance with the present invention, a novel switching arrangement is provided for applying to the input circuit of the servo amplifier an override signal causing the servomotor to drive the receiver synchro rotor away from the stop until a point is reached where normal servo action can occur, whereupon the override signal generator is disconnected. For this purpose there is provided an override signal generator 36 which may, as shown, consist of a transformer having a primary winding 37 energized from the alternating current source 16. The transformer has a secondary winding 38 with a center tap 39 connected to one side of the input circuit 21 of servo amplifier 20. The other ends of the secondary winding 36 are selectively connected to the other side of the input circuit of the servo amplifier through a reset switch 40, the construction of which will now be described.

The reset switch 40 has a contact arm 41 which rotates clockwise from a neutral position N shown in FIGURE 1 to a forward position F in which the left end of the secondary winding 38 is connected to the other side of the input circuit 21 of the servo amplifier through a connection 42. When the switch is rotated counterclockwise from the neutral position N shown in FIGURE 1, the contact arm engages reverse contact R so as to connect the right-hand end of the secondary winding 38 to the input circuit of the servo amplifier. Thus, the reset switch 40 applies the output voltage of the secondary winding 38 of the transformer to the input circuit of the servo amplifier in parallel with the receiver synchro winding 14 with a polarity dependent upon whether the reset switch is rotated to the forward or to the reverse position, the secondary winding 38 being disconnected from the input circuit when the reset switch is in the neutral position N.

The reset switch 40 is actuated between its three positions by means of a rotary switch actuator 43 connected to an extension of shaft 23 so as to rotate with pointer 28 and the rotor of the receiver synchro 14. When the shaft 23 rotates to a position in which the arm 35 approaches the reverse stop 34, the switch actuator 43 engages a flexible spring 44 extending from a rotary hub 45 to which the switch arm 41 is rigidly connected. Further counterclockwise movement of the actuator 43 causes the spring 44 to flex until sufficient energy is stored therein to overpower the resisting force of a positioning means comprising a detent 46 acting to bias the reset switch in each of its three operating positions. When the actuator 43 rotates counterclockwise a sufficient distance, the reset switch snaps from the neutral position N shown in FIGURE 1 and shown in dotted lines in FIGURE 2 to the solid line position F shown in FIGURE 2. Conversely, when the shaft 23 and the rotor of the receiver synchro rotate clockwise to a position in which the arm 35 approaches the forward stop 33, the switch actuator 43 engages the resilient arm 44 of the reset switch 40 and causes it to snap from the neutral position N shown in FIGURE 1 and in dotted lines in FIGURE 3 to the reverse position R shown in solid lines of FIGURE 3.

The detent 46 which may have any suitable construction is shown schematically as comprising a resilient spring 47 having its lower end fixed and its upper end bent to form a projection 47a which releasably engages notches 48, 49 and 50 in an arcuate member 51 rigidly connected by an arm 52 to rotate with the hub 45 of the reset switch 40. The detent 46 biases the switch in each of its three positions, F, N and R until the torque applied to hub 45 by deflection of spring 44 is sufficient to overcome the biasing force of spring 47 whereupon the switch moves to the next position with a snap action. The switch is held in the new position until further actuation by engagement of the projection 47a with one of the three notches 48, 49 and 50 corresponding to the three switch positions as will be clear by reference to the drawing.

It will be understood that in actual practice all of the rotating elements of the receiver synchro will be coupled to and rotate with a single shaft designated in the drawing by the dotted line 23. These rotating elements are the rotor 11a carrying the winding 14, the switch actuator 43, the pointer or indicator 28, the wiper 31 of the potentiometer 32, and the arm 35 which rotates relative to the fixed forward and reverse stops 33 and 34. These elements are shown in the drawing as being laterally displaced for clarity of illustration.

The operation of the signal generator 36 and the reset switch 40 in preventing locking of the receiver synchro rotating elements against stops 33 and 34 will now be described with particular reference to the explanatory diagrams and tabular information shown in FIGURES 4 and 5 of the drawing. In these figures the relative positions of the rotating elements of the transmitter and receiver synchros 10 and 11 are indicated by the positions of pointers 26 and 28 with reference to the fixed circular scales 27 and 29 and forward and reverse stops 33 and 34 for the eight conditions identified as A to H, inclusive. For these conditions the position of the reset switch 40 is designated by the symbols "N" for neutral, "F" for forward and "R" for reverse. Also, the effective control signals applied to the input circuit 21 of the servo amplifier 20 and originating within the rotor winding 14 are designated as "synchro" and those originating in the override signal generator 36 are designated as "override—forward polarity" and "override—reverse polarity."

Referring first to FIGURE 4, the relative positions of the transmitter synchro pointer 26 and the receiver synchro pointer 28 are shown in condition A wherein the pointers are displaced more than 180° within the range of movement between the forward and reverse stops 33 and 34 and the indicator pointer 28 is closer to the forward stop 33 than the reverse stop 34. This condition may, for example, occur when power is reapplied to the servo system after a power failure, and in this case the polarity of the voltage in the output winding 14 of the receiver synchro is such that the servomotor will drive the pointer towards the forward stop 33. As shown in condition B, when the pointer 28 approaches the forward stop 33, the reset switch is actuated from the neutral position to the reverse position by clockwise movement of actuator 43 as shown in FIGURE 3 of the drawing. This causes the override signal generator 36 to apply a reverse polarity voltage to the input circuit 21 of the servo amplifier 20. Because the impedance of the secondary winding 38 of the transformer signal generator is selected to be low relative to the impedance of the winding 14 of the receiver synchro, for example, of the order of 1 to 10, the output winding 14 is in effect short-circuited and the voltage applied to the input circuit 21 by the override signal generator assumes control, causing the servomotor to drive the rotor of the receiver synchro in a counterclockwise direction. When the pointer 28 approaches the position of the reverse stop 34, the actuator 43 moves the reset switch 40 back to the neutral position whereupon the override signal generator is disconnected and the output winding 14 of the receiver synchro again controls the operation of the servomotor as shown in condition C. The polarity of the output voltage of the winding 14 is now reversed from that existing in condition A so that the servomotor drives the pointer 28 clockwise until it reaches a position shown in condition D wherein the transmitter and receiver synchro pointers are synchronized as in normal operation of the servo system. Thus, the override signal generator and reset switch have operated automatically to prevent locking of the receiver synchro rotor against forward stop 33 as would otherwise have occurred as a result of condition A without the reset apparatus.

Referring now to FIGURE 5 of the drawing, condition E shows the relative positions of the transmitter synchro pointer 26 and the receiver synchro pointer 28 as shown for the case where the pointers are displaced more than 180° in the direction of rotary motion of the receiver synchro between the stops 33 and 34 and the receiver synchro pointer 28 is closer to the reverse stop 34 than to the forward stop 33. For this condition, the polarity of the output voltage in the receiver synchro winding 14 is such that the receiver synchro will be driven in a counterclockwise direction to a position approaching the reverse stop 34 as shown in condition F. At this point the reset switch 40 is actuated by counterclockwise movement of the actuator 43 from the neutral position to the forward position shown in FIGURE 2 of the drawing. This causes the override signal generator to apply a voltage to the input circuit 21 of the servo amplifier 20 with a forward polarity. Again, the signal from the override signal generator overpowers the signal from the receiver synchro winding 14 because of the lower impedance of the transformer winding 38 as pointed out above. This causes the servomotor to drive the receiver synchro in a clockwise direction until the pointer 28 approaches the forward stop 33 as shown in condition G. At this point the clockwise movement of the switch actuator 43 actuates the reset switch back to the neutral position disconnecting the override signal generator so that the voltage output from the winding 14 of the receiver synchro once more controls the servomotor. The polarity of this voltage of winding 14 is now the reverse from that which obtained in condition E so that the servomotor drives the receiver synchro counterclockwise until a position is reached shown in condition H wherein the transmitter and receiver synchro pointers 26 and 28 are once more in correspondence, whereupon normal servo system operation is re-established. Thus, the override signal generator and reset switch have again operated automatically, this time to prevent locking of the receiver synchro rotor against reverse stop 34 as would otherwise have occurred as a result of condition E without the reset apparatus.

It will be noted that the above-described reset apparatus requires no relays to effect the desired servomotor reset operation. Furthermore, by use of an override signal generator connected in parallel with and having a low impedance relative to the receiver synchro control winding, it is unnecessary to disconnect the receiver synchro control winding during the reset operation. This simplifies the construction of the reset switch which is required only to connect the override signal generator to the amplifier control circuit with the desired polarity. Thus, the cost, size and weight of the system is reduced and reliability is improved because of simplicity of the control.

In the servo system shown, a simple two-pole transmitter synchro having a rotary mechanical input is shown for clarity of illustration. It will be apparent, however, that other equivalent types of transmitter synchros may be used without departing from the invention. Thus, the transmitter may have a linear rather than a rotary input. Also, the displacement of the transmitter may be accomplished electrically without moving parts. Further, the number of electrical degrees of rotation of the transmitter may be a multiple of the number of degrees of rotation of the mechanical input as would be the case where a transmitter synchro with a greater number of poles than the two-pole construction illustrated with corresponding windings is used as will be apparent to those skilled in the art.

It should be pointed out, also, that while forward and reverse stops such as stops 33 and 34 have been shown, they are not required since they merely represent practical limits of travel of the receiver synchro. Since they are not normally engaged due to action of the reset apparatus, they may be omitted.

While there have been described what are at present considered to be the preferred embodiments of the invention, it will be apparent to those skilled in the art that various changes and modifications may be made therein without departing from the spirit or scope of the invention.

What I claim as new and desire to secure by Letters Patent of the United States is:

1. In an electric servomotor system,
   a transmitter synchro having a rotor,
   a receiver synchro electrically connected to the transmitter synchro and having a rotor with an output winding in which a reversible polarity voltage is induced,
   a reversible servomotor connected to drive the receiver synchro rotor,
   polarity-senstive electroresponsive means controlling the direction of rotation of the servomotor,
   means connecting the receiver synchro output winding to said electroresponsive means so that said servomotor normally drives the receiver synchro rotor to a position corresponding to the position of the transmitter synchro rotor between forward and reverse limits of travel displaced more than 180° but less than 360° of rotary movement of the receiver synchro,
   an override signal generator having an output voltage,
   means including a reset switch having forward, neutral and reverse positions connecting the override signal generator to the electroresponsive means with a polarity to cause the servomotor to drive the receiver synchro rotor in forward and reverse directions when the reset switch is in the forward and reverse positions, respectively, said override signal generator being disconnected when said reset switch is in the neutral position,
   an actuator coupled to rotate with the receiver synchro rotor arranged to engage and actuate the reset switch progressively to the neutral and reverse positions and to the neutral and forward positions as the receiver synchro approaches, respectively, said forward and reverse limits of travel, and positioning means maintaining said reset switch in said forward, neutral, and reverse positions until actuated to a different position by said actuator when it approaches said forward and reverse limits of travel.

2. A servo system as set forth in claim 1 wherein the electroresponsive means comprises a polarity-sensitive amplifier having an input circuit including the output winding of the receiver synchro and the override signal generator is connected to the input circuit by the reset switch.

3. A servo system as set forth in claim 1 wherein the electroresponsive means comprises a polarity-sensitive amplifier having an input circuit to which the output winding of the receiver synchro is connected and the reset switch connects the override signal generator in parallel with the receiver synchro output winding in the forward and reverse positions, the impedance of the override signal generator being relatively low as compared to the impedance of the output winding of the receiver synchro whereby the receiver synchro is disabled from controlling the servomotor when the override signal generator is connected in parallel therewith by the reset switch.

4. In a servo system as set forth in claim 1 wherein the actuator is coupled to the reset switch through an energy storage spring and the positioning means comprises detent means biasing the switch in each of its three positions until sufficient energy is stored in the energy storage spring by the actuator to overpower the detent means and actuate the reset switch with a snap action.

5. A servo system comprising electrically connected transmitter and receiver synchro units, the transmitter unit having a movable member displaced in accordance with an input quantity and the receiver synchro having a rotor with an output winding rotatable between forward and reverse stops displaced greater than 180° but less than 360° of rotary movement, a reversible servomotor connected to drive the receiver synchro rotor, polarity-sensitive electroresponsive means including an input circuit connected to the output winding of the receiver synchro to control the direction of rotation of the servomoter whereby the servomotor normally drives the receiver synchro rotor into correspondence with the position of the movable member of the transmitter synchro, reset apparatus for preventing the servomotor from locking the receiver synchro rotor against the forward and reverse stops when the transmitter and receiver are initially displaced more than 180 electrical degrees, said reset apparatus comprising:

an override electric signal generator having an impedance lower than the impedance of output winding of the receiver synchro rotor winding, a reset switch having forward, neutral and reverse positions, an actuator coupled to rotate with the receiver synchro rotor and arranged to actuate said reset switch progressively to the neutral and reverse positions as the receiver synchro rotor approaches the forward stop and progressively to the neutral and forward positions as the receiver synchro rotor approaches the reverse stop, positioning means maintaining said reset switch in said forward, neutral, and reverse positions until actuated to a different position by said actuator when it approaches the forward and reverse stop positions, and circuit means interconnecting said override signal generator, reset switch and the input circuit arranged to connect the override signal generator to the input circuit with a polarity to cause said servomotor to drive the receiver synchro rotor in the reverse direction when said reset switch is in the reverse position and in the forward direction when the reset switch is in the forward position and to disconnect the override signal generator when the reset switch is in the neutral position whereby the override signal generator controls the direction of rotation of the servomotor when connected to the input circuit of the electroresponsive means and locking of the receiver synchro when against the forward and reverse stops is prevented.

6. Reset apparatus for a synchro system having transmitter and receiver synchros and a servomotor energized by polarity-sensitive electroresponsive means normally controlled by an output winding of the receiver synchro for driving the receiver synchro into correspondence with a transmitter synchro between forward and reverse limits of travel, said reset apparatus comprising:

an override signal generator, a polarity-reversing reset switch having forward, neutral and reverse positions connecting said signal generator to said electroresponsive means in the forward and reverse positions and disconnecting the signal generator in the neutral position, an actuator for said switch adapted to be coupled to the receiver synchro for actuating said switch from the neutral to the reverse and the neutral to the forward positions as the receiver synchro approaches its limits of travel in the forward and reverse directions during normal servo operation, and positioning means maintaining said reset switch in said forward, neutral, and reverse positions until actuated to a different position by said actuator when it approaches its limits of travel in the forward and reverse directions.

7. Reset apparatus for a synchro system as set forth in claim 6 wherein the signal generator is connected in parallel with the control winding of the receiver synchro by the reset switch in the forward and reverse positions and has a low impedance compared to said control winding whereby said control winding is effectively disabled from controlling the servomotor when the reset switch is in said forward and reverse positions.

8. Reset apparatus for a synchro system as set forth in claim 6 wherein the actuator is coupled to the reset switch through an energy storage spring and the positioning means comprises a detent means biasing the switch in each of its three positions until sufficient energy is stored in the energy storage spring by the actuator to overpower the detent means and actuate the reset switch with a snap action.

References Cited by the Examiner
UNITED STATES PATENTS

| 2,439,094 | 4/1948 | Miles | 318—30 X |
|---|---|---|---|
| 2,750,546 | 6/1956 | Washburn | 318—28 |
| 2,788,478 | 4/1957 | Gray | 318—30 |
| 2,833,971 | 5/1958 | Gray | 318—30 |
| 3,197,684 | 7/1965 | Riege | 318—20 |

References Cited by the Applicant
UNITED STATES PATENTS 2,439,094  4/1948  Miles.

ORIS L. RADER, *Primary Examiner.*

JOHN F. COUCH, *Examiner.*

B. DOBECK, *Assistant Examiner.*